Figure 4:
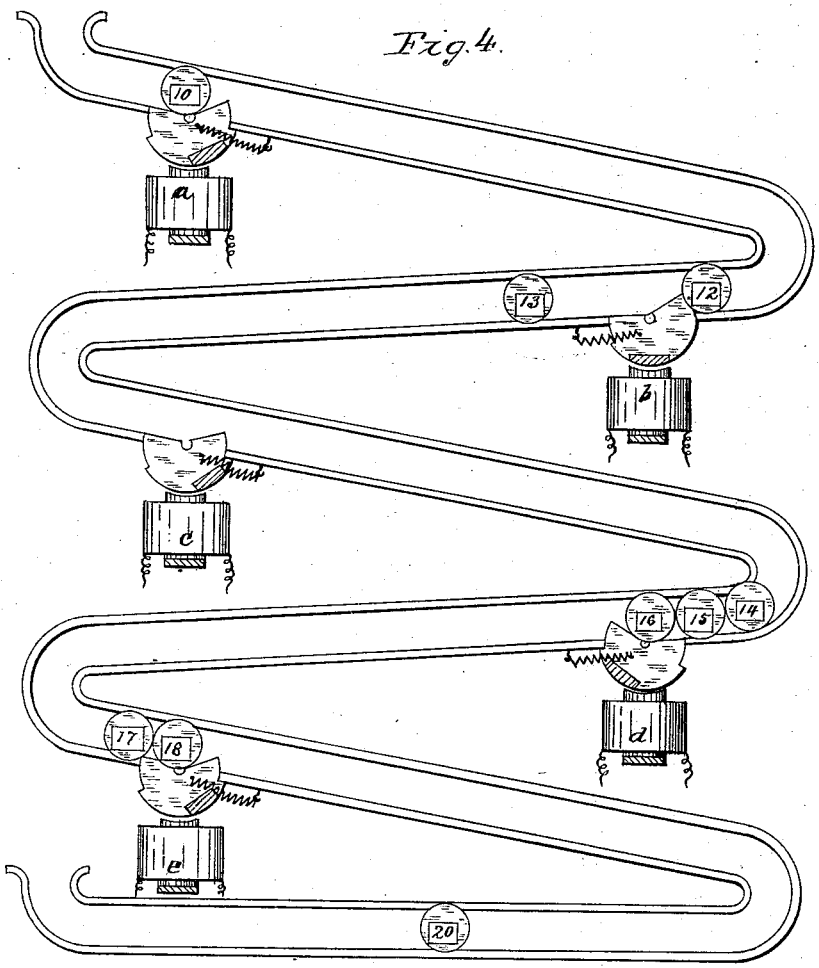

(No Model.) 2 Sheets—Sheet 1.
J. H. HUNTER & J. S. LUCOCK.
APPARATUS FOR INDICATING THE POSITIONS OF RAILWAY CARS.
No. 484,205. Patented Oct. 11, 1892.
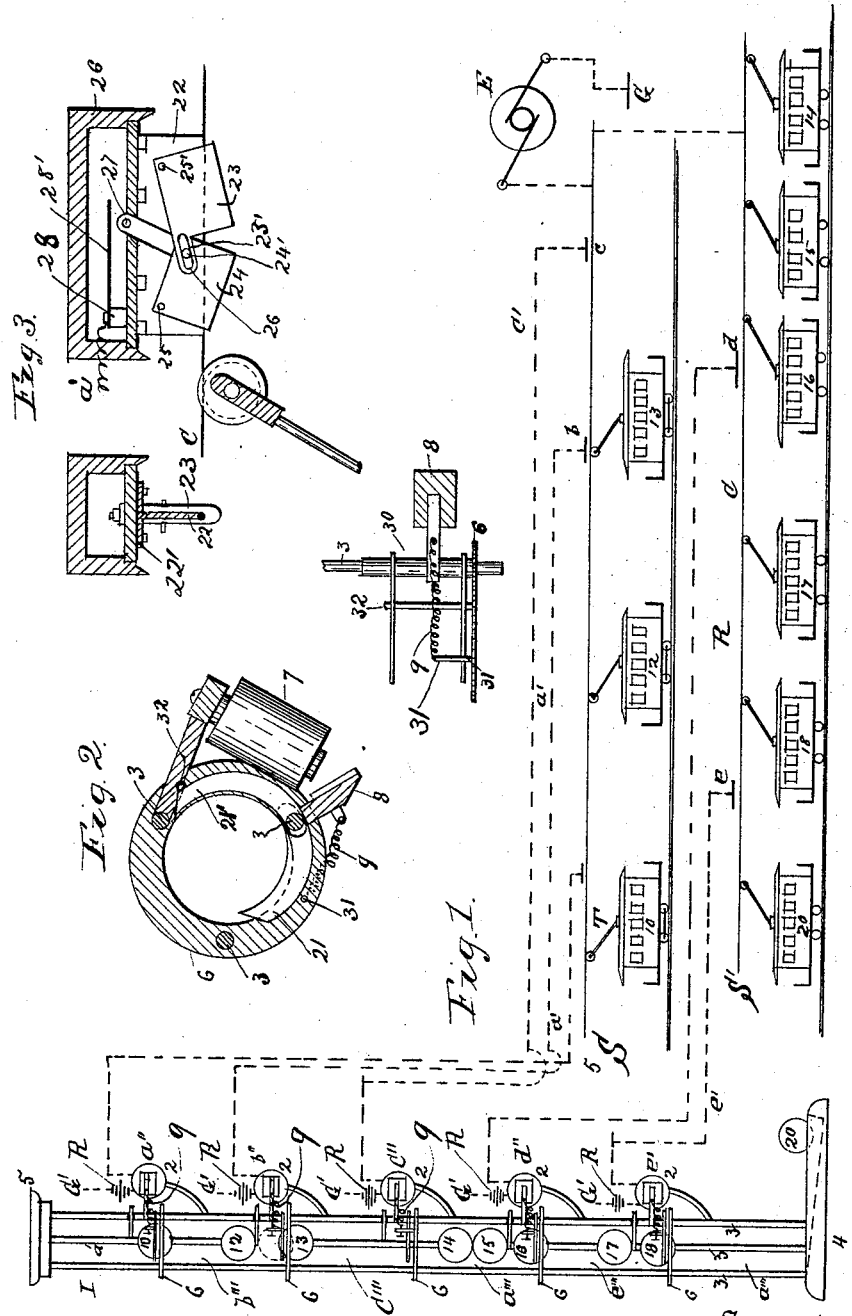
Witnesses
Ann Bell.
M. E. Perry.
Inventors
Joseph H. Hunter and
John S. Lucock
By their Attorney
A. M. Necker (No Model.) 2 Sheets—Sheet 2.
J. H. HUNTER & J. S. LUCOCK.
APPARATUS FOR INDICATING THE POSITIONS OF RAILWAY CARS.
No. 484,205. Patented Oct. 11, 1892.

UNITED STATES PATENT OFFICE.

JOSEPH H. HUNTER, OF PITTSBURG, AND JOHN S. LUCOCK, OF ALLEGHENY, PENNSYLVANIA.

APPARATUS FOR INDICATING THE POSITIONS OF RAILWAY-CARS.

SPECIFICATION forming part of Letters Patent No. 484,205, dated October 11, 1892.

Application filed June 24, 1891. Serial No. 397,370. (No model.)

*To all whom it may concern:*

Be it known that we, JOSEPH H. HUNTER, a citizen of the United States, residing at Pittsburg, in the county of Allegheny and State of Pennsylvania, and JOHN S. LUCOCK, a subject of the Queen of Great Britain, residing in the city of Allegheny, county and State aforesaid, have invented new and useful Improvements in Apparatus for Indicating the Positions of Railway-Cars, of which the following is a specification.

Our invention relates to improvements in an apparatus for indicating and tracing the position of moving cars upon railroads with reference to each other and to the termini of said road; and the objects of it are to automatically indicate the positions of cars upon a railroad being operated with reference to each other and the termini of said road. We attain these objects in the manner and by means of the apparatus described in the specification and illustrated in the accompanying drawings, which drawings form a part of said specification.

In the drawings, Figure 1 shows an elevation of one kind of indicator and the connections of the electrical conductors between it and the source of electricity operating the same. Fig. 2 is a section of one of the indicators of Fig. 1, showing the escapement. Fig. 3 is a sectional view of the contact mechanism, showing the contact plates in elevation; Fig. 4, a modification of the indicator.

Like references refer to like parts throughout.

The general plan of our invention is as follows, viz: The road the position of whose cars is to be traced and indicated is divided into any desired number of sections. Electrical devices are placed at the dividing-lines of said sections with such relation to the tracks of the road-bed that contact-making devices carried by the cars may be operated in connection with such electrical device, so as to bring it automatically by the movement of the cars into electrical connection with sub-conductors which are provided for each section into which the roadway is divided. Each of said sub-conductors is connected at one end to one of the contact devices situate at the dividing-lines of the sections of the road, the other end being connected to one of the several electro-magnets of the indicator situate in the station or car-dispatcher's office, the circuit beyond said electro-magnets going to the earth and having included therein in any practicable position a source of electricity. The indicator is divided into as many sections as the road is divided into, each section thereof representing a section of the road. The cars of the road in the indicator are represented by visual devices, which are caused to move from section to section thereof as the cars move from section to section of the road, each car controlling the movement of the particular visual device representing it. The devices representing the cars are ordinarily caused to move by gravity and are brought into condition to be acted upon by that force by the operation of an electrical device which is brought into action automatically by the passage of a car from one section of the road to another.

In Fig. 1, R is the road of a railway starting from station at S and returning to the same at S'; C, a conductor, in this instance strung overhead the entire length of the same and charged with electricity from source of electricity E, one pole of which is connected to conductor C and the other to the earth. $a'$ $a''$ $a'''$ are indicators representing the several sections of the road—viz., $a$ $b$ $c$ $d$ $e$, with appropriate exponents, the same relations existing in all the sections between the parts named. Each of the cars have a contact-making device T, which may be any of the trolleys ordinaily in use having grooved wheels to run upon the overhead conductor.

The construction of the indicator 1 is as follows: Three rods 3 3 3, of any suitable material, are fixed in the base 4 equidistant from each other, and their other ends are fastened in a ring 5, thus forming a guide or chute, through which the balls representing the cars may pass. Five rings 6, the road being divided into five sections here, are placed equidistant upon said rods forming the guides, thus dividing the indicator into as many sections as the road, the lowest section in the indicator between the lowest ring and the base forming part of section $a'''$, the balls being in the same when cars are in the station. Just above each of rings 6 a sleeve 30 is placed around one of the rods 3 in such a manner that it will rotate freely on the same. Two quadrants, made of any suitable material, preferably of light sheet metal, are fixed to sleeve 30, the inside curve of said quadrants being an arc of a circle whose diameter is the same as the diameter of the hole in ring 6. There is also fastened to sleeve 30 an armature 8 for electro-magnet 7. In ring 6 there are placed two pins 31 and 32, 31 to fasten the spring 9 to and 32 to stop the motion of sleeve 30, and consequently that of quadrants 21 and 21'. To each of rings 6 and one of the rods forming the guide or chute of the indicator electro-magnets 7 are fixed, whose terminals are connected to the sub-conductors and the earth, as above set forth. The quadrants 21 and 21' are placed upon said sleeve 30 at some distance from each other sufficient, when two balls are in one section of the indicator, to interpose one quadrant in the path of the upper ball to hold the same in said section of the indicator while the lower ball is leaving the same, thus performing to some degree the functions of an escapement and allowing but one ball to pass from a section at one time. The distance of the quadrants from each other and the size of the hole in ring 6 are controlled by the size of the ball representing the car, which should be a shade smaller in diameter than said holes.

The construction of the contact device shown in Fig. 3 is as follows: 22 is a metal plate grooved at its lower edge to receive the conductor C, to which it is soldered, and having lugs 22', by which it is fastened to the box 26. Two plates 23 and 24 are bent and drilled so as to be fixed to plate 22 by pins 25 and 25'. Plate 23 has two slotted lugs 23', one on each of its sides, which work over pins 24', one on each side of plate 24, which has also a lug 24" on each of its sides or leaves extending up into box 26. These plates 23 and 24 are U-shaped in cross-section and extend up on either side of the plate 22. An insulated standard 28 is fastened to the bottom of box 26, to which is attached spring 28', which is a conductor of electricity. One of the sub conductors is connected to spring 28', as $a'$.

The effects of the operation of our invention are shown in Fig. 1. When the cars are in the station, the balls representing them will be in section $a'''$, either at the top or bottom of the indicator, the ball in the top section indicating that car 10 is in the station but in readiness to start upon the outbound trip, the ball 20 in the bottom section indicating that car 20 is arriving at the station on the incoming trip. When car 10 reaches contact device $a$, then plates 23 and 24, Fig. 3, by reason of the trolley T of the car passing under them, will be forced upward, and lug 24" of plate 24 will be brought into contact with spring 28, and an electrical impulse will be sent through electro-magnet $a''$ in section $a'''$ of the indicator, which will then attract its armature and withdraw quadrant 21 from the path of ball 10, thereby allowing it to drop into section $b'''$ of the indicator simultaneously with car 10 passing into section $b$ of the road, thereby indicating the position of car 10 on the road to be in section $b$. It will be observed from the figure that car 12 is in section $b$ of the road, and that car 13 is passing from section $b$ to section $c$. By looking at the indicator this fact is apparent, the electrical impulse having been sent by the car, the electro-magnet $b''$ has attracted its armature, which rotates quadrants 21 and 21', thereby withdrawing from the path of ball 13 quadrant 21 and placing in the path of ball 12 quadrant 21', and by so doing releasing ball 13, allowing it to drop into section $c'''$ of the indicator and holding ball 12 in section $b'''$, and after the current is withdrawn allowing ball 12 to assume the position of ball 13 before the car 13 passed the contact device $b$. Cars 14 15 16 are in section $d$ of the road and their representative balls in section $d'''$ of the indicator, as is also the case with cars 17 and 18 with respect to sections of the road and indicator representing them. Ball 20, representing car 20, is in the bottom section $a'''$, indicating that that car is about arriving at the station on the incoming trip. When the last-mentioned car is about to start on its outgoing trip, the ball representing it will be placed in the top section $a'''$, and the operations to indicate its positions along the line will be same as above set forth, the operations being repeated for each trip the car makes.

Fig. 4 represents a modification of the indicator, in which a series of inclined planes composed of two rods fastened to a base take the place of the three rods of indicator I. Sheaves having plates inscribed with the numbers of the cars take the place of the balls and in which each alternate plane represents a section of the road, the notched disks replacing the quadrants 21 and 21'. The connection of the electro-magnets and the conductor, sub-conductor, source of electricity, and contact devices, &c., being the same as shown in Fig. 1.

The utility of our invention consists largely in affording the means of informing the car-dispatcher or superintendent of a railway of the position of the cars upon his road with relation to each other and the termini thereof. If, for example, an accident should happen which would delay one of the cars, the other cars not being affected by it would proceed on their several trips, and in passing the several contact devices at the various sections of the road would indicate at the station that all the cars behind the one affected by the accident would be crowding into one section, indicating at the station that there was trouble on the road and the place where it was situate. It would also check any disposition on the part of persons in charge of the cars to run and operate them other than upon schedule time.

We have described two forms of indicators, and also an overhead conductor for conveying the current to the devices shown to carry our invention into effect; but we do not limit ourselves to such constructions, our invention being applicable on any class of road, with the necessary changes in construction to apply the principle thereof to the various styles of railroads or railways.

What we claim as our invention, and desire to secure by Letters Patent, is—

1. In a car-indicator, the chute, the annular perforated partitions dividing the chute into sections, in combination with the visual balls, each of which represent the position of a car on its track, the electro-magnets, and the circuit-closers for controlling the movement of the balls, substantially as and for the purpose set forth.

2. In an apparatus for indicating and tracing the movements of cars upon a railroad-track, the track divided into sections, as shown, the electric closing devices at the end of each of said sections connected with the sections of a chute, in combination with said chute, the annular perforated partitions dividing the chute into sections equal in number to the track-sections, the electro-magnet with which each chute-section is provided, each magnet having an armature provided with two curved arms concentric with the perforations of the said annular partitions, the visual devices capable of passing through said annular partitions, and means, such as shown and described, for electrically controlling the movements of said visual devices from cars upon the track.

3. In an apparatus for indicating and tracing the movements of cars upon a railroad-track, the combination, with a road divided into sections, the electric-circuit closing devices such as shown and described located at the end of each of said sections, of a chute divided into the same number of indicator-sections as the road, the ring 6, which divides said indicator-sections, the visual balls located in the chute, and the electrical connections from the cars on the road to the indicators, substantially as set forth.

4. In an indicator, the combination of a chute divided into sections by annular perforated partitions, an electro-magnet for each of said sections, said electro-magnets each having an armature upon which are mounted two curved arms concentric with the holes in said annular partitions, substantially as described.

5. In an indicator, the combination of a chute divided into sections by annular perforated partitions, electro-magnets for each of said sections, each having an armature provided with two curved arms concentric with the holes of said annular partitions, and visual devices capable of passing through said annular partitions, substantially as described.

Witness our hands this 12th day of June, A. D. 1891.

JOSEPH H. HUNTER.
JOHN S. LUCOCK.

Witnesses:
DAVID S. McCANN,
A. M. NEEPER.